United States Patent [19]
Willyoung

[11] 3,739,213
[45] June 12, 1973

[54] COMPACT CONNECTION SYSTEM FOR POLYPHASE ARMATURE WINDING

[75] Inventor: David M. Willyoung, Scotia, N.Y.

[73] Assignee: General Electric Company, Schenectady, N.Y.

[22] Filed: June 15, 1972

[21] Appl. No.: 263,254

[52] U.S. Cl.................. 310/198, 310/202, 310/206
[51] Int. Cl. ............................................ H02k 3/00
[58] Field of Search............ 310/179, 198, 200–208

[56] References Cited
UNITED STATES PATENTS

| | | | |
|---|---|---|---|
| 2,447,647 | 8/1948 | Hancock.......................... | 310/204 X |
| 2,731,576 | 1/1956 | McElligott.......................... | 310/202 |
| 2,778,962 | 1/1957 | Taylor................................. | 310/202 |
| 3,201,627 | 8/1965 | Harrington...................... | 310/206 X |
| 3,408,517 | 10/1968 | Willyoung...................... | 310/206 X |
| 3,476,964 | 11/1969 | Willyoung...................... | 310/202 X |
| 3,601,642 | 8/1971 | Willyoung...................... | 310/206 X |
| 3,660,705 | 5/1972 | Willyoung.......................... | 310/198 |

*Primary Examiner*—D. F. Duggan
*Attorney*—William C. Crutcher and John W. Mitchell

[57] ABSTRACT

An armature winding, comprising series connected phase belts which in turn comprise series-connected coils, is connected in a compact manner by using coil conductors with equal end-arm span at opposite ends and non-radial (slanted) connecting elements between coil conductors plus phase belt jumper connections at a first end to advance the winding in the direction of current flow. Connections to the phase terminals can be made at the other end, permitting separation of the line end and neutral end terminals in substantially diametrically opposite peripheral locations. This minimizes the axial span requirements per phase for winding connections and phase terminals and is useful for the construction of generators with multiple sets of polyphase output (e.g., six phase generators).

14 Claims, 19 Drawing Figures

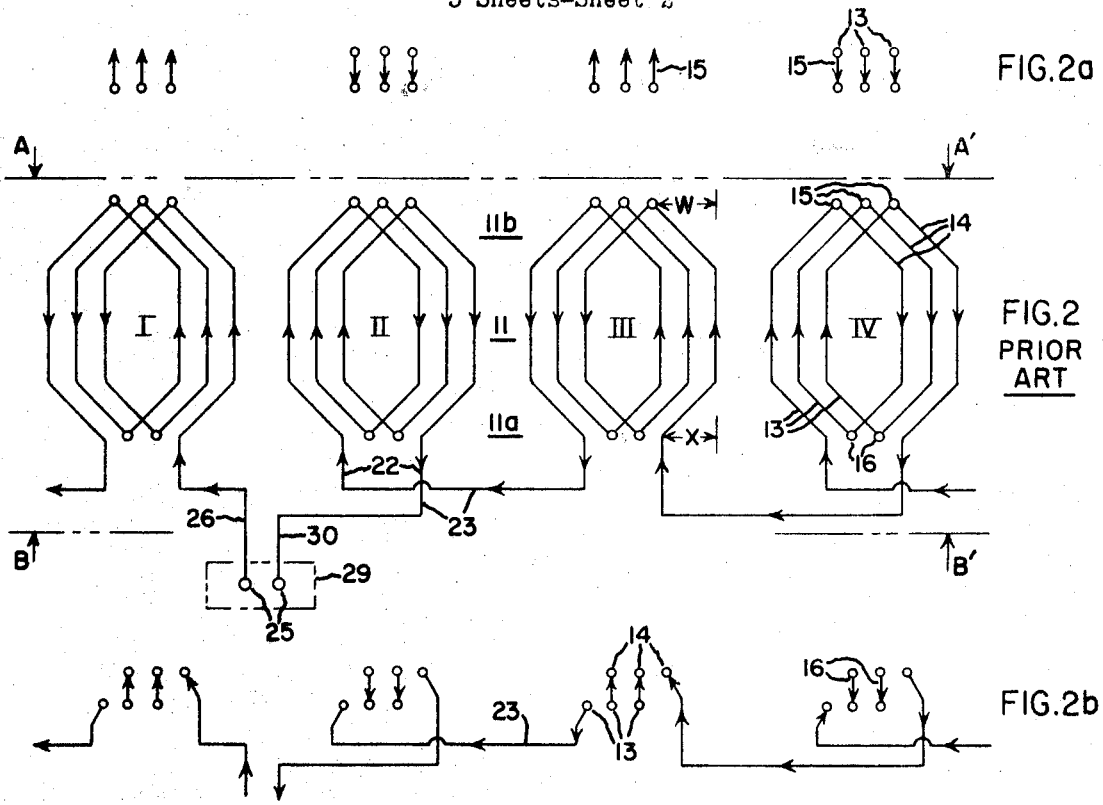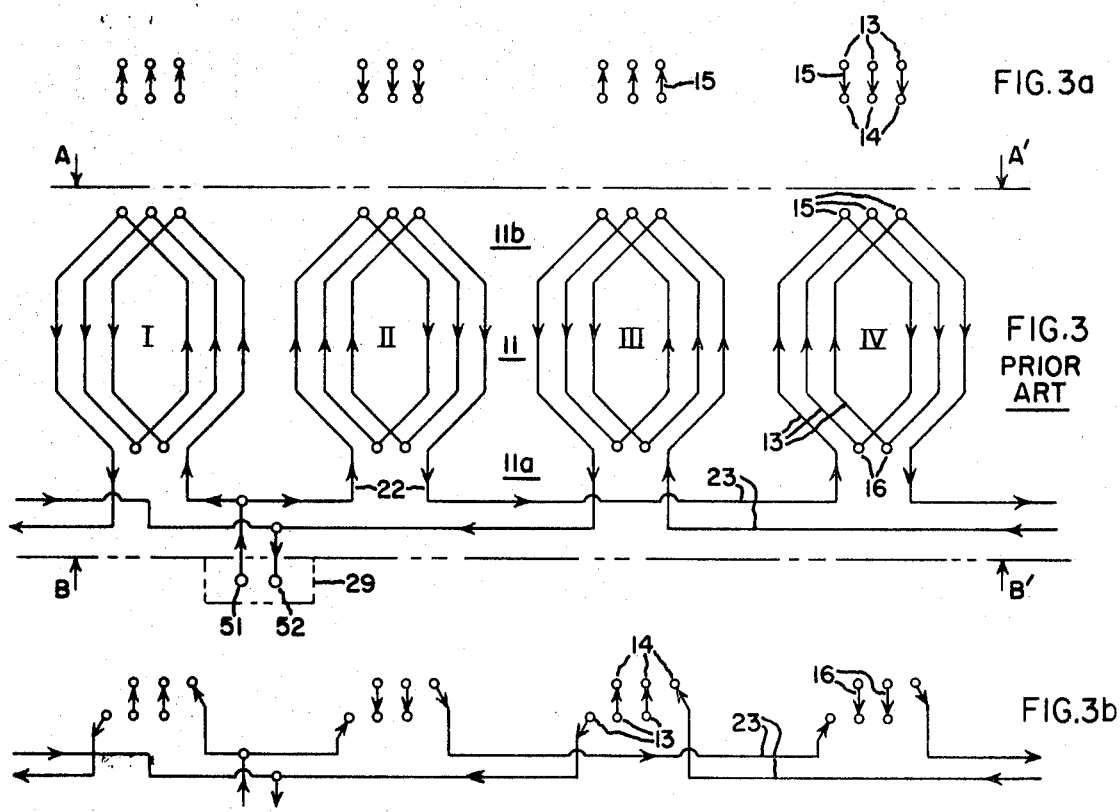

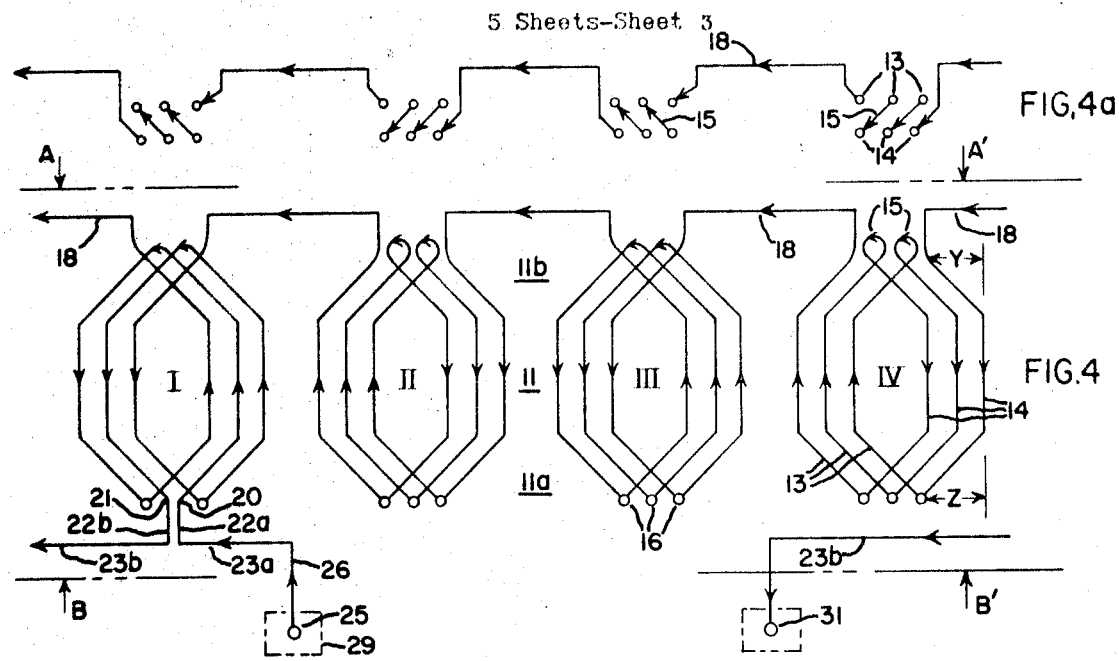
FIG. 4a
FIG. 4
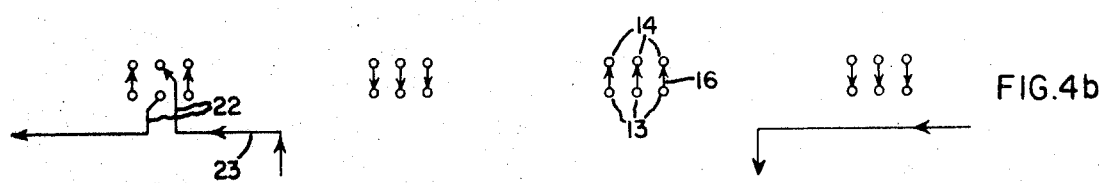
FIG. 4b
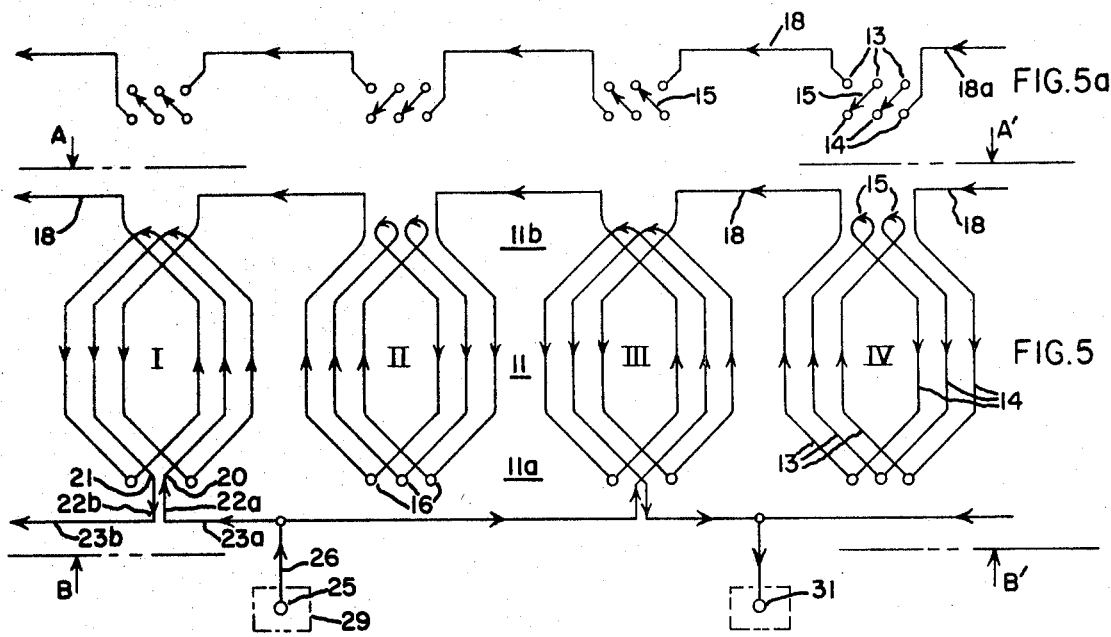
FIG. 5a
FIG. 5
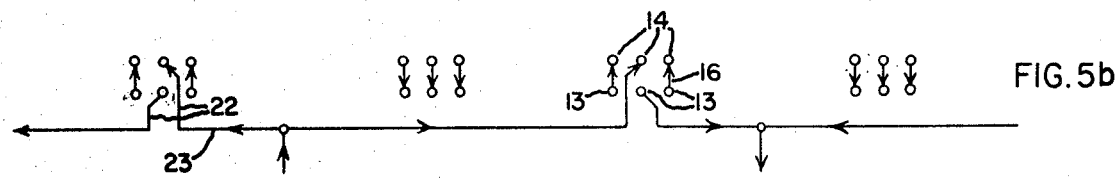
FIG. 5b

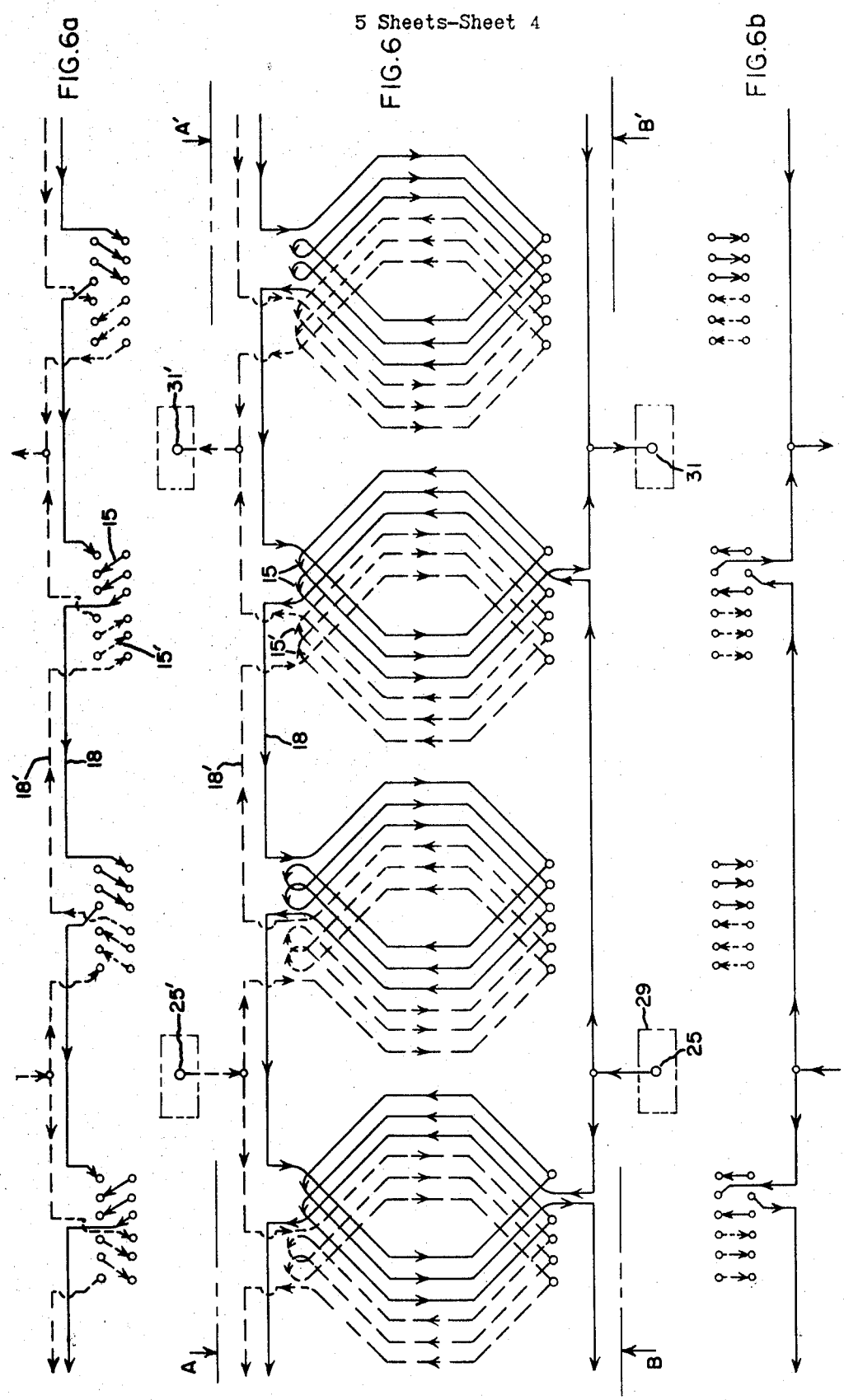

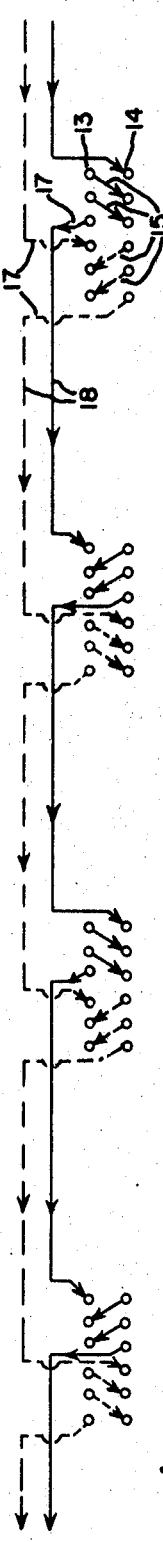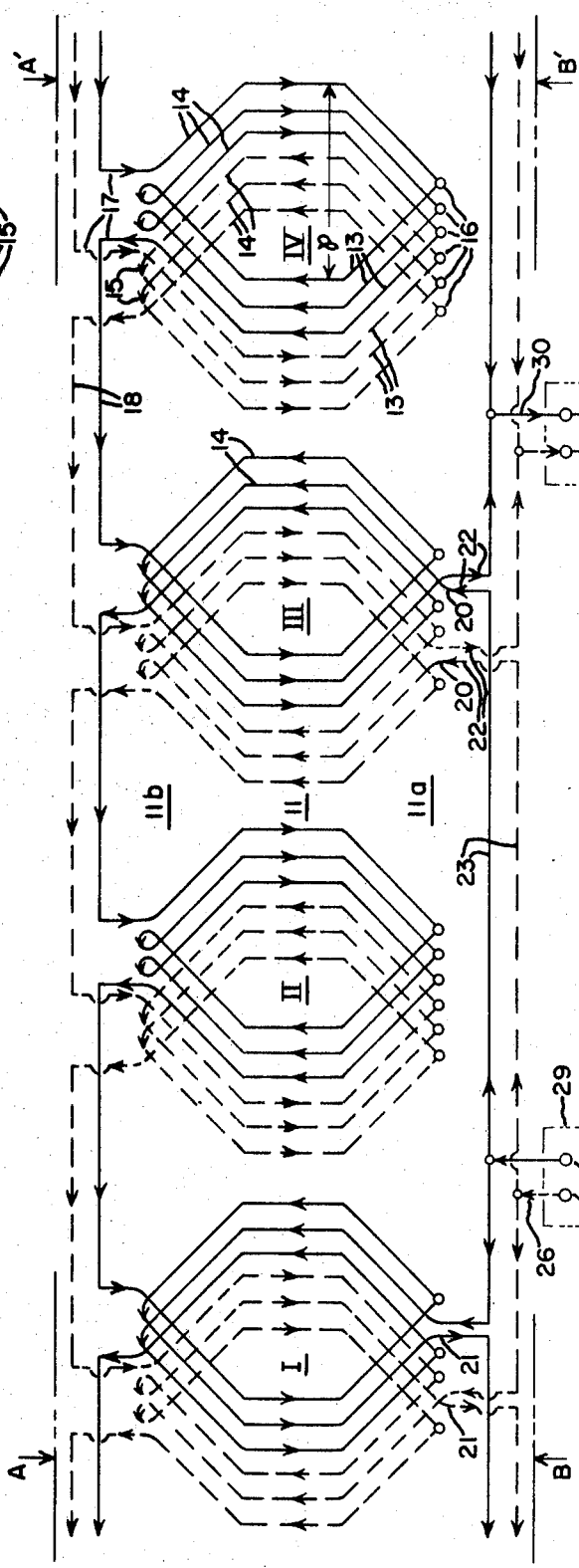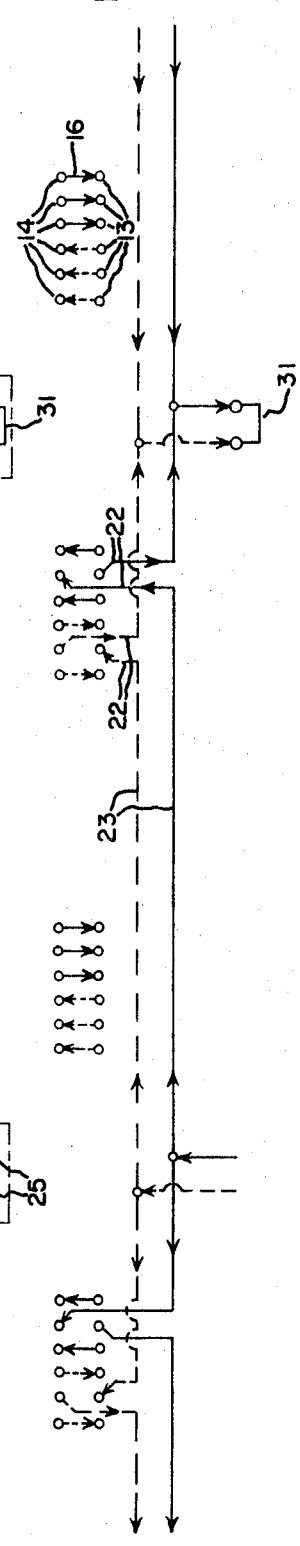

COMPACT CONNECTION SYSTEM FOR POLYPHASE ARMATURE WINDING

BACKGROUND OF THE INVENTION

The present invention relates to armature windings for large dynamoelectric machines, and more particularly, to a unique connection system with reduced space requirements for connection ring elements and terminal bushings, arranged so that the line end terminals and neutral end terminals can be located at essentially diametrically opposite locations at one end or both ends of the machine. The system is particularly advantageous for large generators employing multiple sets of polyphase windings (e.g., six phase machines), as well as for designs in which static excitation arrangements are integrated with the winding connections, coolant systems and structure of the main generator.

The armature windings of large three-phase turbine generators are commonly arranged in a two-layer lap winding distributed uniformly in slots around the inside periphery of a stationary core, with six phase belts of series-connected coils (each subtending an angle of 60 electrical degrees) for each pair of rotor poles. Those phase belts which are separated by 180 electrical degrees, or some multiple thereof, generate identical voltages and are connected with the proper polarity in series or parallel to produce a phase winding. Three such phase windings separated mechanically in the core structure by 120° comprise the total three-phase winding. Two-pole generators will, therefore, have their corresponding phase belts under opposite poles connected in series or parallel to provide a one-circuit/phase or two-circuit/phase winding. Similarly, four-pole generators with one, two or four circuits/phase are easily constructed and well known.

Physically, the conductors which connect the phase belts into circuits or the circuits to the terminals of the generator are located in a series of axially displaced annular spaces located radially behind the armature end windings at one end of the stator core, and typically only five or six such annular spaces, depending on the size of the conductors, their dielectric clearance requirements and other machines parameters, can be accommodated in the minimum axial span that would otherwise be required. In other words, space for these connection rings elements will determine the generator bearing span if more than some minimum number of annular positions must be provided. An increased generator bearing span is undesirable, of course, because it reduces the rotor critical speeds, makes the rotor more sensitive to unbalance forces, increases the rotor bending stresses, and because any increase in the shipping dimensions and weight of these very long units is onerous.

Similarly, for large high voltage generators, while six high voltage bushings can be accommodated in a single terminal box at one end of the generator within the span and space required for other functions such as ventilation or geometrical connection, additional space and span are likely to be needed if more than six bushings per terminal box are necessary.

As generators have increased in rating and physical dimensions, the generated voltage per conductor has increased, requiring that a reduced number of series-connected coils per circuit be used to avoid excessive terminal voltage. At the same time, means to maintain or increase the number of stator coils and slots in the armature have been sought to avoid excessive values of double-frequency, electromagnetically-induced forces on the armature conductors, it being known that the electromagnetic force per unit length of conductor varies approximately inversely with the number of stator slots. This has led to the development of systems for subdividing the adjacent coils in at least some of the 60° (electrical) phase belts into additional groups, which by proper choice and interconnection have been arranged to provide an increased number of circuits per phase, each generating essentially the same voltage and carrying essentially the same fraction of the total phase current, with a consequent reduction in the number of series-connected coils per circuit for a particular number of stator slots. Typical windings of this type are the two-pole, four-circuit systems taught by Taylor in U.S. Pat. No. 2,778,962 and Willyoung in U.S. Pat. No. 3,408,517, and the four-pole, three-circuit systems taught by Harrington in U.S. Pat. No. 3,152,273 and Willyoung in U.S. Pat. No. 3,476,964.

Another proposal for reducing the phase voltage as larger generators are considered has been to use more phase belts per pole pair, resulting in an increase in the total number of phases. For example, McElligott has taught in U.S. Pat. No. 2,731,576 how 12 phase belts per pole pair can be used to generate six-phase power which is converted to three-phase power in suitably arranged transformers external to the generator. Generators of even lower basic impedance (rated voltage divided by rated current) for the very largest ratings or for special purposes can be built by the synergetic combination of these six-phase winding arrangements with certain sub-divided phase belt arrangements as taught in U.S. Pat. No. 3,601,642 issued to Willyoung.

All the aforementioned patents are assigned to the present assignee.

As the total winding in increasingly sub-divided into more phases, circuits per phase, or phase belt sections per circuit, it becomes increasingly difficult to provide space for the increased number of jumper connections between circuit sections or the end connections to the phase terminals. Similarly, as more phases are employed, space and arrangements for additional phase terminals must be provided.

Recently, in pending application Ser. No. 155,512 filed in the names of H. Kudlacik and D. Willyoung on June 22, 1971 are assigned to the present assignee, arrangements have been described for integrating static excitation equipment into the armature winding connections system, the cooling system and the basic machine structure. This application, which is incorporated herein by reference, described a preferred embodiment in which the line end terminals of an armature winding of unspecified number of phases are separated peripherally from the neutral end terminals, permitting excitation transformers to be linked advantageously with the neutral end phase leads. An improved system of winding connections which requires minimum axial space and which allows the line ends and neutral ends of the phases to be separated peripherally is advantageous for this arrangement, of course.

The foregoing problems are substantially eased by this invention which provides a winding system for the series connection of winding circuit sections under different poles requiring the minimum number of annular spaces for connection ring elements behind the armature windings and which permits the line end and neutral end phase terminals to be separated peripherally in opposite regions at one end or both ends of the generator.

SUMMARY OF THE INVENTION

Accordingly, one object of the invention is to provide a polyphase generator with a unique, new and improved armature winding.

Another object is to provide a compact connection system which permits the accommodation of an increased number of phases.

Another object is to provide a compact connection system which conveniently separates the line end and neutral ends of the phases in diametrically opposite regions.

A further object of this invention is to provide an armature winding utilizing armature bars or coil conductors with equal end-arm span on each end, slanted series coil connections between armature bars within a phase belt, and jumper connections between phase belt sections to produce circuits in which the winding pattern advances peripherally through these connection elements in the direction of current flow.

A still further objective is to provide a winding connection system for large generators with minimum rotor bearing span and terminal bushing space requirements.

Breifly stated, these objectives are accomplished by a modified lap winding arrangement characterized by the combination of armature coil conductors with equal peripheral span in their two end arms, non-radial connecting elements (i.e., series loops) slanting oppositely on successive poles, and jumper connections between circuit sections under successive poles, all at a first spatial end of the generator (i.e., the physical end of the generator core). This permits connections to the line end and neutral end terminals to be located at the other spatial end (or at both ends in certain embodiments) of said generator in substantially diametrically opposite regions.

BRIEF DESCRIPTION OF DRAWINGS

The invention, both as to its organization and principal of operation, together with further objects and advantages thereof, may better be understood by reference to the following detailed description of an embodiment of the invention when taken in conjunction with the accompanying drawings in which:

FIG. 2 is a developed schematic winding pattern of one phase of a prior art armature winding for a single circuit, four-pole generator. FIG. 2a and FIG. 2b are schematic views of the conductor connections for this pattern as viewed along sections A–A¹ and B–B¹ respectively in FIG. 2.

FIG. 3 is a developed schematic winding pattern of one phase of a prior art armature winding for a double circuit, four-pole generator. FIG. 3a and FIG. 3b are schematic views of the conductor connections for this pattern as viewed along sections A–A¹ and B–B¹ respectively in FIG. 3.

FIG. 4 is a schematic winding pattern of one phase of a single circuit, four-pole generator in accordance with this invention. FIG. 4a and FIG. 4b are schematic views of the conductor connections for this pattern as viewed along sections A–A¹ and B–B¹ respectively in FIG. 4.

FIG. 5 is a schematic winding pattern of one phase of a double circuit, four-pole generator in accordance with this invention. FIG. 5a and FIG. 5b are schematic views of the conductor connections for this pattern as viewed along sections A–A¹ and B–B¹ respectively in FIG. 5.

FIG. 6 is a schematic winding pattern of two adjacent phase windings of a four-pole, double circuit armature winding of unspecified number of total phases and unspecified coil pitch in accordance with this invention in which phase terminals of a first polyphase set are located on one spatial end while phase terminals of second polyphase set are located at the other spatial end. FIG. 6a and FIG. 6b are schematic views of the conductor connections for this pattern viewed along sections A–A¹ and B–B¹ respectively in FIG. 6.

FIGS. 7, 7a and 7b are identical to FIGS. 6, 6a, and 6b except that all terminals are located at one spatial end, in accordance with the preferred embodiment shown in FIG. 1.

DESCRIPTION OF THE PREFERRED EMBODIMENT

Figure 1:
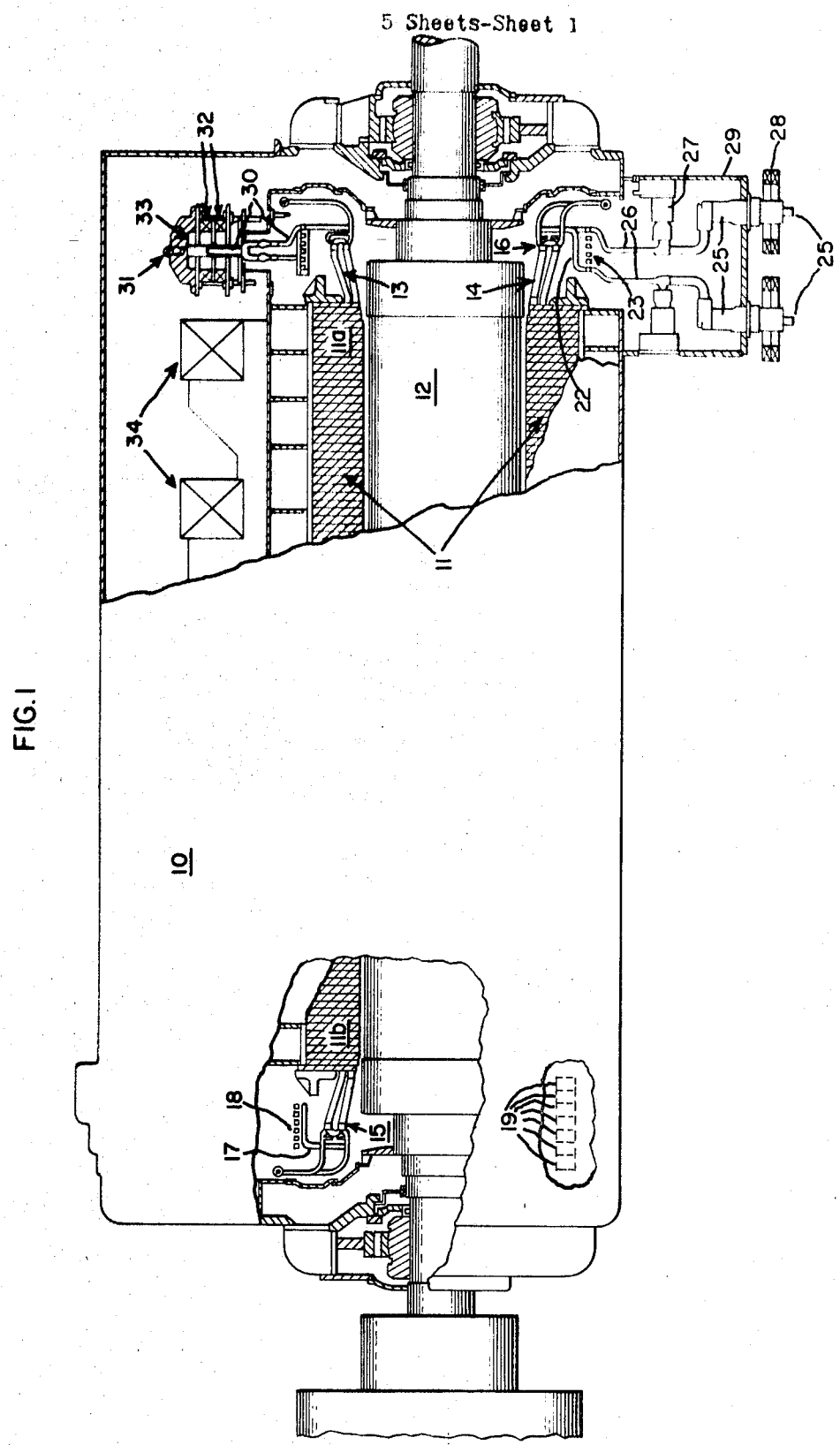
FIG. 1 is a generator partly in section utilizing six phase output and separated line end and neutral end phase terminals in accordance with this invention.

Referring now to FIG. 1 and FIG. 7 of the drawing, there is illustrated a dynamoelectric machine in the form of a generator 10 and embodying the preferred form of the present invention. The generator 10 includes a stationary armature element 11 disposed about a rotor 12. The armature core element 11 has a "connection" end 11a at one spatial end of the core and a "turbine" end 11b at the other spatial end of the core. Disposed in slots in the armature element 11 is a polyphase armature winding composed of radially outermost, bottom layer armature bars 13 lying in the bottom of the armature slots and a layer of radially innermost, top layer armature bars 14 lying in the top position in the armature slots.

In prior art constructions (see FIGS. 2, 2a, 2b, 3, 3a, and 3b) top and bottom armature bars 14 and 13 have been joined at turbine end 11b by turbine end series loop elements 15 which are radially oriented to form one turn coils. These coils, in turn, have been connected in series at the other spatial end 11a by connection end series loop elements 16 which we also radially oriented to form phase belt sections.

In accordance with the embodiment of this invention, shown by FIGS. 1 and 7 phase belt sections may be joined by turbine end backset elements 17 to jumper connection elements 18 which are located in annular connection ring spaces 19 set radially outside the armature end windings at the turbine end. The series connection of one or more phase belt sections comprises a circuit and one or more circuits connected in parallel comprise a phase winding. The total armature winding comprises several phases, substantially identical in structure, displaced peripherally in the slots of armature element 11. The coils of the armature winding are arranged to encircle at least part of the flux of successive rotor poles I, II, III, IV in this four-pole depiction of the invention, the fraction being determined by the coil pitch, shown as span $p$ on pole IV of FIG. 7. Typically, the coils are short pitched or "chorded" so that $p$ subtends less than 180 electrical degrees. In FIG. 7, the coil pitch $p$ is unspecified and can assume any value relative to the pitch of magnetic poles I, II, III, IV. It will be understood by those skilled in the art that top layer armature bars 14 of coils encircling pole III, for example, may fall in the same slots as some or all of the bottom layer armature bars 13 of coils encircling pole IV, as determined by coil pitch p. Since these specific relationships are not important to the operation or understanding of this invention, the phase belt windings linking the flux from each rotor pole have been separated for clarity in these drawings.

Referring again to FIGS. 1 and 7, the armature bars at the ends of the circuits which comprise the phase windings will have ends of opposite electrical polarity denoted as line ends 20 and neutral ends 21. These are connected by connection-end backset elements 22 to connection ring elements 23 which lie in annular spaces (not shown, but similar to annular spaces 19 at the turbine end). Connection or jumper ring elements 23 connect the two circuits of each phase together, in the embodiment shown, into a phase winding and carry the line ends 20 and neutral ends 21 of the phase windings to substantially diametrically opposite peripheral regions at connection end 11a of armature element 11. Line ends 20 of the phases are connected to line end high voltage bushings 25 by means of line end lead connections or phase leads 26, supported by mechanical stand-off insulators 27. Line end current transformers 28 are mounted outside the generator casing on the high voltage bushings 25. The high voltage bushings 25 are located in a generator terminal box 29 below the generator 10.

Neutral ends of the phases are carried by top-side or neutral end phase leads 30 from connection rings 23 to neutral disconnects 31 where they are joined together to form the neutral point of a star-connected multiple polyphase winding inside the casing of generator 10. Neutral end current transformers 32 supported by insulating structure 33 are linked with neutral end phase leads 30 and arranged to cooperate with line end current transformers 28 for metering and protective relaying of generator 10 according to well known practices which do not constitute part of this invention. It will be understood from the already cited co-pending application Ser. No. 155,512 that the neutral end phase leads 30 can be arranged to link static excitation transformers not shown in addition to neutral end current transformers 32 if this form of generator excitation should be utilized.

Also depicted in generator 10 is conventional cooling apparatus 34 which cools generator 10 in a manner known in the art.

In FIGS. 2, 2a, 2b, 3, 3a, 3b, 4, 4a, 4b, 5, 5a, 5b, 6, 6a, and 6b the same numeric designators as used for the preferred embodiment shown by FIGS. 1, 7, 7a, and 7b have been retained for bottom layer armature bars 13, top layer armature bars 14, turbine end series loop elements 15, connection end series loop elements 15, connection end series loop elements 16, turbine end backset elements 17, turbine end jumper connection elements 18, connection end backset elements 22, connection rings 23, high voltage bushings 25, line end phase leads 26, generator terminal box 29, neutral end phase leads 30, neutral disconnects 31, and successive rotor poles I, II, III and IV.

FIG. 2 shows a prior art representation of one phase of a single circuit armature winding of unspecified pitch in armature core element 11 having a connection end 11a and a turbine end 11b for a four-pole generator. The single circuit winding comprises four series-connected phase belts, each associated with and arrayed in identical position relative to one of the sequential rotor poles I, II, III, IV, as is known in the art. Each phase belt consists of a plurality of coils, depicted as three series-connected coils in this representation. Coils are formed by connecting top layer armature bars 14 to bottom layer armature bars 13 with radial series loop elements 15 at turbine and 11b. The peripheral span W (shown in developed view in the drawing) at the turbine end 11b of the top layer armature bars 14 has been greater than the peripheral span X of the same bars at connection end 11a by one-half a slot pitch in the prior art. The same is true for the bottom layer armature bars 13 permitting coils within a phase belt to be series-connected with radial series loop elements 16. Phase belts are connected in series or to the line end or neutral terminals by means of backsets 22, connection or jumper ring elements 23, and terminal connection leads 26 and 30. The line end and neutral end of each phase are commonly brought to a single terminal box 29 and brought out through high voltage bushings 25 for external connection to the power system. Note that two different annular positions are required to accommodate connection and jumper connection elements 23 at the connection end 11a of the generator. Except for any nesting which might be achieved due to the peripheral spacing of different phases, the number of annular positions required for connection ring elements behind the armature winding is equal to twice the number of phases. Similarly, the number of high voltage bushings in terminal box 29 equals twice the number of phases for this arrangement. For more than three phases, this is likely to increase the required axial span of the generator at the connection end.

FIG. 3 shows a prior art representation of one phase of a double-circuit armature winding of unspecified pitch in armature element 11 having a connection end 11a and a turbine end 11b for a four-pole generator. The phase winding comprises a parallel combination of six coils per circuit with a current input at line end bushing 51 and an output at neutral end bushing 52. Just as for the prior art, single circuit winding of FIG. 2, the number of annular positions required for connection or jumper ring elements 23 and the number of high voltage bushings in terminal box 29 at connection end 11a is equal to twice the number of phases.

In accordance with the present invention, FIG. 4 shows one phase of a single circuit armature winding of unspecified pitch in armature element 11 having a connection end 11a and a turbine end 11b arranged to cooperate with the magnetic flux associated with four rotor poles I, II, III, IV. Top layer armature bars 14 are formed with peripheral span Y at turbine end 11b equal to peripheral span Z at connection end 11a. Similarly, the peripheral span of the end arms for the bottom layer armature bars 13 is made equal at each end. Coils are formed and series-connected into circuits by means of radial series loop elements 16 at connection end 11a and by the combination of slanted series loop elements 15 and phase belt jumper elements 18 at turbine end 11b. It should be noted that the slanted series loop elements 15 advance the winding in direction of an arbitrarily assumed current flow.

Arrowheads indicate an arbitrarily assumed direction of current flow through the winding from line end high voltage bushing 25 located in terminal box 29, through line end lead 26, connection ring element 23a, backset elements 22a at the connection end into line end 20 of the armature winding on the phase belt opposite pole I of the rotor. After progressing through part of the conductors in this phase belt, the current is carried to the phase belt opposite adjacent pole IV by means of jumper connection element 18. The phase belts opposite rotor poles IV, III, and II are successively connected in this manner and the current returns to phase belt I where it completes its circuit, emerging at neutral end 21. Backset connections 22b and connection ring element 23b carry the current to neutral end terminal 31 which is located substantially diametrically opposite line end terminal bushing 25.

Only one annular position is required for connection ring 23 at the connection end 11a or for jumper connection elements 18 at the turbine end 11b in FIG. 4, and space for only one high voltage bushing 25 per phase is required in terminal box 29. This provides a substantial advantage in the design of generators with more than three phases, (six phases, for example) since the minimum axial span for connection ring elements and high voltage bushings is required. Because the neutral end leads are located substantially opposite the high voltage or line leads, they can be conveniently linked with static excitation equipment.

FIG. 5 is similar to FIG. 4 except that the invention is applied to a double circuit, four-pole armature winding. Each circuit consists of 12 series-connected conductors located in three of the four phase belts. The same circuit connection elements are employed and the same advantages that accrue for FIG. 4 are achieved. It is interesting to note that the turbine end circuit connection elements for this double circuit winding as shown in FIG. 5a are identical to those for the single circuit winding shown in FIG. 4a, and again the slanted series loop elements 15 and jumper connector elements 18 act to advance the winding in the arbitrarily assumed direction of current flow.

The great versatility of this new system of construction for armature windings is illustrated in FIG. 6, where the windings for two adjacent phases of a four-pole generator with two circuits/phase are shown. The first phase is shown in solid lines and its winding connections can be seen to be identical to those of FIG. 5, requiring one annular position at each spatial end of the generator for connection ring or jumper connection elements, with the line ends of this phase being brought out through high voltage bushing 25 in terminal box 29 at a position substantially opposite the neutral end terminal 31. The adjacent phase winding, as shown in its entirety by dotted lines, is connected from the opposite spatial end or turbine end, requiring only one annular position at the turbine end for connection ring and jumper connection elements, and locating the line end and neutral end terminals 25' and 31' in substantially opposite diametrical regions. Even though the dotted phase winding has been connected from the opposite end relative to the solid winding, it will be seen that the respective slanted loops 15' and 15 and the respective jumper connections 18' and 18 act to advance the respective winding pattern in the arbitrarily assumed direction of current flow in each case. It will be evident to those skilled in the art that this provides a means for connecting phase windings which permits all the line ends of one set of balanced polyphase windings to be connected to high voltage bushings in a terminal box at one end of a generator with their neutral ends being located in a substantially opposite region at the same end where they can be connected together, preferably within the generator casing, in a common star point for this first polyphase set. A second set of balanced polyphase windings can then be arranged with similar terminal arrangements at the opposite end. If such a generator were a six phase generator, the three line ends of each balanced three-phase set would be located in a terminal box at one end, while the other three line end terminals would be located in a separate terminal box at the opposite end. The neutrals for each set would be located diametrically opposite the line ends and could have separate static excitation supplies integrated into their respective neutral lead structures. Three annular connection positions would be filled at one end of the generator while six would be required at the other. Other winding arrangements combining these types of connection systems for different phases to equalize the number of connection rings at each end can be used and it is the intent of this disclosure to include all such variations.

FIG. 7 represents the preferred embodiment of the invention in which all line end terminals are located in one terminal box at one spatial end of the generator, all neutral end phase terminals are located in the substantially diametrically opposite position at the same spatial end and only one annular connection ring position is required per phase at each end. It is believed that this arrangement provides the greatest convenience in connecting external bus runs to the generator, and will produce a six phase generator with no greater axial span requirements than a three phase generator of the same power rating.

It has been shown that by providing an armature winding with a plurality of series connected phase belt sections, each section further comprising a plurality of series connected coils, a compact and unique winding arrangement will result. This is accomplished by utilizing armature bars with equal end arm peripheral span, successively poled phase belt sections connected to each other in series, and providing non-radial (slanting) connection elements at one end connecting the armature bars in series, all in the direction of current flow.

While several embodiments and applications of this invention have been shown and described, it will be apparent to those skilled in the art that many more modifications are possible without departing from the inventive concepts herein described. The invention, therefore, is not to be restricted except as is necessary by the prior art and by the spirit of the appended claims.

What is claimed is:

1. A multi-pole polyphase armature winding for a multi-slot stationary armature core element having a first and second spatial end comprising:
   one or more star-connected balanced polyphase winding sets,
   each phase of any of said balanced polyphase winding sets having a neutral end and a line end electrical termination and further having a plurality of successively poled phase belt sections, wherein each of said phase belt sections further comprises a plurality of series connected coils;
   each coil further comprising top and bottom armature bars wherein said top and bottom armature bars of each coil have substantially equal end arm peripheral span at said first and second spatial ends of the armature element;

phase belt connections at said first spatial end connecting said successively poled phase belt sections in series to advance the winding in the direction of current flow; and slanting series loop connection elements also at said first spatial end connecting said top and bottom armature bars in series to advance the winding in the direction of current flow.

2. The armature winding as in claim 1 further including radial series loop connection elements at said second spatial end of said armature element connecting top and bottom armature bars in series to advance the winding in the direction of current flow.

3. The armature winding of claim 1 wherein the neutral end and line end terminations for one balanced polyphase winding set are located at said second spatial end of said armature element.

4. The armature winding of claim 1 wherein the neutral end and line end terminations for one balanced polyphase winding set are located at said first spatial end of the armature element.

5. The armature winding of claim 1 wherein the neutral ends and the line ends of at least one balanced polyphase winding set are located substantially diametrically opposite each other on the same spatial end of said armature element.

6. The armature winding of claim 5 wherein only one balanced polyphase winding set is used.

7. The armature winding of claim 1 wherein two phase-displaced balanced polyphase winding sets are used.

8. The armature winding of claim 7 wherein the neutral end and line end electrical terminations of both balanced polyphase winding sets are located at the same spatial end of said armature element.

9. The armature winding of claim 7 wherein the neutral end and line end terminations of a first balanced polyphase winding set are located at one spatial end of the armature element while the corresponding electrical terminations of a second balanced polyphase set are located at the other spatial end of the armature element.

10. The armature winding of claim 9 wherein the neutral ends and line ends of each balanced polyphase winding set are located in substantially diametrically opposite locations at their respective ends of the armature element.

11. The armature winding of claim 1 wherein each of said polyphase winding sets has a plurality of parallel-connected circuits per phase.

12. A dynamoelectric machine comprising:
a multipole rotor;
a polyphase winding and a multi-slot stationary armature core element having a first and second spatial end;
each phase comprising a plurality of successively poled phase belt sections, wherein each of said phase belt sections further comprises a plurality of series connected coils;
each coil further comprising top and bottom armature bars, wherein said top and bottom armature bars of each coil have equal end arm peripheral span at said first and second spatial ends;
phase belt connections at said first spatial end connecting said successively poled phase belt sections to each other in series to advance the winding in a direction of current flow; and
slanting connection elements at said first spatial end connecting said top and bottom armature bars in series to advance the winding in the direction of current flow.

13. A dynamoelectric machine as in claim 12 wherein neutral end line and line end terminations of said phase windings are located substantially diametrically opposite each other on one spatial end of said armature element.

14. A dynamoelectric machine as in claim 13 wherein said electrical terminations are located at the second spatial end of the armature element.

* * * * *